(12) United States Patent
Jiang et al.

(10) Patent No.: US 8,693,790 B2
(45) Date of Patent: Apr. 8, 2014

(54) FORM TEMPLATE DEFINITION METHOD AND FORM TEMPLATE DEFINITION APPARATUS

(75) Inventors: Yan Jiang, Beijing (CN); Rui Zhang, Beijing (CN); Toshifumi Yamaai, Kanagawa (JP); Yoshihisa Ohguro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 269 days.

(21) Appl. No.: 13/037,901

(22) Filed: Mar. 1, 2011

(65) Prior Publication Data

US 2011/0222776 A1  Sep. 15, 2011

(30) Foreign Application Priority Data

Mar. 11, 2010  (CN) .......................... 2010 1 0121993

(51) Int. Cl.
*G06K 9/62* (2006.01)

(52) U.S. Cl.
USPC ........... 382/224; 382/182; 382/159; 382/173; 382/176; 382/190; 382/209; 382/218

(58) Field of Classification Search
CPC ... G06K 9/6292; G06K 9/00711; G06K 9/46; G06K 9/00147
USPC ......... 382/224, 181, 159, 173, 176, 190, 209, 382/218
See application file for complete search history.

(56) References Cited

U.S. PATENT DOCUMENTS

| | | | | |
|---|---|---|---|---|
| 5,317,646 | A * | 5/1994 | Sang et al. ..................... | 382/175 |
| 6,246,976 | B1 * | 6/2001 | Mukaigawa et al. ............. | 704/9 |
| 6,721,451 | B1 * | 4/2004 | Ishitani ......................... | 382/181 |
| 7,508,984 | B2 * | 3/2009 | Ohguro ......................... | 382/181 |

OTHER PUBLICATIONS

Li Xingyuan, et al. "A Robust Method for Unknown Forms Analysis", Proc. of 5th International Conference on Document Analysis and Recognition, 1999, 4 Pages.
Luiz Antonio Pereira Neves, et al. "Methodology of Automatic Extraction of Table-Form Cells", Proc. of 13th Brazilian Symposium on Computer Graphics and Image Processing, 2000, 7 Pages.
Hiroshi Shinjo, et al. "A Recursive Analysis for Form Cell Recognition", Proc. of 6th International Conference on Document Analysis and Recognition, 2001, 5 Pages.
Takashi Hirano, et al. "Field Extraction Method from Existing Forms Transmitted by Facsimile", Proc. of 6th International Conference on Document Analysis and Recognition, 2001, 5 Pages.

* cited by examiner

*Primary Examiner* — Mike Rahmjoo
(74) *Attorney, Agent, or Firm* — Oblon, Spivak, McClelland, Maier & Neustadt, L.L.P.

(57) ABSTRACT

Disclosed are a form template definition method and a form template definition apparatus. The form template definition method comprises a cell extraction step of analyzing an image of a form so as to extract one or more cells from the image of the form; a cell classification step of classifying the extracted cells; and a cell attribute definition step of defining attributes of the extracted cells class by class. If an attribute of a first cell in one class is defined, then other cells in the class automatically copy the attribute of the first cell. As a result, the work amount of form template definition may be dramatically reduced by employing the form template definition method and form template definition apparatus.

9 Claims, 25 Drawing Sheets

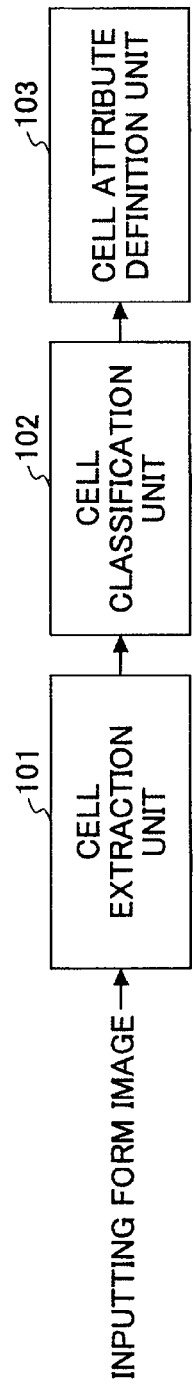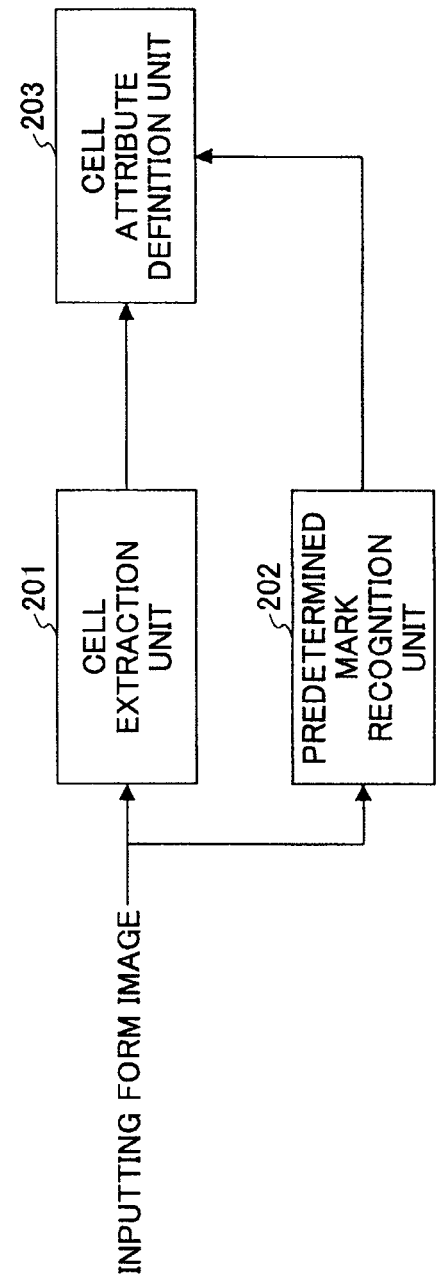

FIG.5

| TRANSFER ACCOUNT | FINANCIAL AGENCY 501 | FINANCIAL AGENCY | BANK CREDIT ASSOCIATION | CREDIT UNION AGRICULTURAL OR FISHERY COOPERATIVE | BRANCH | BRANCH HEADOFFICE |
|---|---|---|---|---|---|---|
| | | | BRANCH | DEPOSIT TYPE ① SAVING ② CHECK | ACCOUNT NUMBER | 502 SEAL |
| | ACCOUNT HOLDER | BUSINESS NAME 503 | | | 504 | |
| | | REPRESENTATIVE | | | | |

FIG.6

| TRANSFER ACCOUNT | FINANCIAL AGENCY | CODE | | | | FINANCIAL AGENCY | | | | BRANCH | | | BANK CREDIT UNION CREDIT AGRICULTURAL OR ASSOCIATION FISHERY COOPERATIVE | BRANCH HEADOFFICE |
|---|---|---|---|---|---|---|---|---|---|---|---|---|---|---|
| | | | | | | | | | | | | | DEPOSIT TYPE ① SAVING ② CHECK | ACCOUNT NUMBER |
| | ACCOUNT HOLDER | FURIGANA | | | | | | | | | | | | SEAL |
| | | BUSINESS NAME | | | | | | | | | | | | |
| | | REPRESENTATIVE | | | | | | | | | | | | |

FIG.12

| CORNER / INTERSECTION | ⌈ | ⌊ | ⌋ | ⌉ |
|---|---|---|---|---|
| ⌈ (L-shape) | ○ | | | |
| ⊢T (T-up with left) | ○ | | | ○ |
| ⊤⌉ | | | | ○ |
| ⊤ (T-down) | ○ | ○ | | |
| + | ○ | ○ | ○ | ○ |
| ⊥⊤ | | | ○ | ○ |
| ⊔ | | ○ | | |
| ⊥ | | ○ | ○ | |
| ⌊⊤ | | | ○ | |

FIG.16

| D) | | | | | | | | | | YEN |
|---|---|---|---|---|---|---|---|---|---|---|
| C | | | | | | | | | | YEN |
| E) | | | | | | | | | | YEN |

FIG.20

STEP 1: EXTRACTING CONNECTING AREAS $(x_{1,1}, y_{1,1}, x_{1,2}, y_{1,2})$, $(x_{2,1}, y_{2,1}, x_{2,2}, y_{2,2})$, ..., $(x_{N,1}, y_{N,1}, x_{N,2}, y_{N,2})$ IN CELL 1; HERE N REFERS TO NUMBER OF CONNECTING AREAS IN FORM 1, $(x_{I,1}, y_{I,1}, x_{I,2}, y_{I,2})$ REFERS TO CIRCUMSCRIBED RECTANGLE OF I-TH CONNECTING AREA, $(x_{I,1}, y_{I,1})$ REFERS TO POSITION OF UPPER LEFT CORNER OF CIRCUMSCRIBED RECTANGLE, AND $(x_{I,2}, y_{I,2})$ REFERS TO POSITION OF LOWER RIGHT CORNER OF CIRCUMSCRIBED RECTANGLE.

STEP 2: WITH REGARD TO ANY TWO DIFFERENT CONNECTING AREAS $(x_{I,1}, y_{I,1}, x_{I,2}, y_{I,2})$ AND $(x_{J,1}, y_{J,1}, x_{J,2}, y_{J,2})$, IF MIN$(y_{I,2}, y_{J,2})$ > MAX$(y_{I,1}, y_{J,1})$ AND MIN$(x_{I,2}, x_{J,2})$ > MAX$(x_{I,1}, x_{J,1})$, THEN COMBINING THESE TWO CONNECTING AREAS. WITH REGARD TO ALL CONNECTING AREAS IN CELL 1, REPEATLY CARRYING OUT COMBINATION PROCESSING UNTIL THERE IS NO NEW COMBINATION.

STEP 3: COMBINING ALL CONNECTING AREAS IN CELL 2 ACCORDING TO STEP 1 AND STEP 2.

STEP 4: SUPPOSING THAT $G_A$ AND $G_B$ ARE NUMBERS OF COMBINED CONNECTING AREA SETS IN CELL 1 AND CELL 2, RESPECTIVELY.
IF $\| G_A - G_B \| > T_1$ (HERE $T_1$ IS PREDETERMINED THRESHOLD VALUE), THEN DETERMINING THAT CELL 1 AND CELL 2 ARE NOT SIMILAR, AND SKIPPING FOLLOWING PROCESS;
OTHERWISE:
K = 0;
FOR I = 1 TO $G_A$
    FINDING OUT IMAGE DATA $I_{A,I}$ CORRESPONDING TO I-TH CONNECTING AREA SET;
    FOR J = I TO $G_B$
        FINDING OUT IMAGE DATA $I_{B,J}$ CORRESPONDING TO J-TH CONNECTING AREA SET;
        OBTAINING BINARY IMAGES $IN_{A,I}$ AND $IN_{B,J}$ HAVING SAME LENGTH AND WIDTH BY NORMALIZING $I_{A,I}$ AND $I_{B,J}$, AND SUPPOSING THAT HEIGHT OF NORMALIZED IMAGES IS H, AND WIDTH OF NORMALIZED IMAGES IS W;

IF $\sum_{0 \leq P < H, 0 \leq Q < W} XOR(IN_{A,I}(P,Q) IN_{B,J}(P,Q)) \leq T_2 \times W \times H$ (HERE $T_2$ IS PREDETERMINED THRESHOLD VALUE),
THEN K = K + 1, AND GOING TO NEXT I LOOP;
    END FOR
END FOR
IF K > $T_3$ $(G_A + G_B)$ / 2, THEN DETERMINING THAT CELL 1 AND CELL 2 ARE SIMILAR (HERE $T_3$ IS PREDETERMINED THRESHOLD VALUE); OTHERWISE DETERMINING THAT CELL 1 AND CELL 2 ARE NOT SIMILAR.

FIG.21

| | MONTHLY FEE (TAX EXCLUDED) | MAINTENANCE CONTRACT DATE | | | |
|---|---|---|---|---|---|
| | | YEAR 2101 | MONTH 2102 | YEAR 2103 | DAY 2104 |
| | YEN | | | | |
| MAINTENANCE FEE EACH TIME (TAX EXCLUDED) | YEN | ⑩ SPECIAL STIPULATION | | | |

| | | |
|---|---|---|
| MAINTENANCE FEE COLLECTION (CIRCLE) | YES | |
| MAINTENANCE CONTRACT H | LEASED PROPERTY | |
| MAINTENANCE OBJECT | LEASED PROPERTY | |
| MAINTENANCE FEE EACH TIME (TAX EXCLUDED) | | |
| CONSUMPTION TAX, ETC. | | |
| MAINTENANCE FEE EACH TIME (TAX INCLUDED) | | |
| COLLECTION START DATE | YEAR | MONTH |

MAINTENANCE FEE COLLECTION

| | | | | |
|---|---|---|---|---|
| D) | | | | YEN |
| C | | | | YEN |
| E) | | | | YEN |
| R | DURING PERIOD, MIDTERM CANCELLATION IS UNAVAILABLE. | | | |
| Y | YEAR 2105 | YEAR 2106 | MONTH 2107 | DAY 2108 |

FIG.22

| | | | | | | | |
|---|---|---|---|---|---|---|---|
| MAKER: | | | | | | | |
| OBJECT NAME: | | 2201 | | | | | |
| MANUFACTURE NO. | | | | | | | |
| COLLECTION | YES · NO | MONTHLY FEE (TAX EXCLUDED) | | | | | YEN |
| | | MAINTENANCE FEE EACH TIME (TAX EXCLUDED) | | | | | YEN |
| MAKER: | | | | | | | |
| OBJECT NAME: | | 2202 | | | | | |
| MANUFACTURE NO. | | | | | | | |
| COLLECTION | YES · NO | MONTHLY FEE (TAX EXCLUDED) | | | | | YEN |
| | | MAINTENANCE FEE EACH TIME (TAX EXCLUDED) | | | | | YEN |
| MAKER: | | | | | | | |
| OBJECT NAME: | | 2203 | | | | | |
| MANUFACTURE NO. | | | | | | | |
| COLLECTION | YES · NO | MONTHLY FEE (TAX EXCLUDED) | | | | | YEN |
| | | MAINTENANCE FEE EACH TIME (TAX EXCLUDED) | | | | | YEN |

FIG.23

| | | 2301 | | | |
|---|---|---|---|---|---|
| 1 | MAKER: | | | | |
| | OBJECT NAME: | 2302 △ | | 2303 | |
| | MANUFACTURE NO. | | MONTHLY FEE (TAX EXCLUDED) | | YEN 2304 |
| | COLLECTION | YES · NO | MAINTENANCE FEE EACH TIME (TAX EXCLUDED) | | YEN |
| 2 | MAKER: | | | | |
| | OBJECT NAME: | 2305 | | 2306 | |
| | MANUFACTURE NO. | | MONTHLY FEE (TAX EXCLUDED) | | YEN 2307 |
| | COLLECTION | YES · NO | MAINTENANCE FEE EACH TIME (TAX EXCLUDED) | | YEN |
| 3 | MAKER: | | | | |
| | OBJECT NAME: | 2308 | | 2309 | |
| | MANUFACTURE NO. | | MONTHLY FEE (TAX EXCLUDED) | | YEN |
| | COLLECTION | YES · NO | MAINTENANCE FEE EACH TIME (TAX EXCLUDED) | | YEN |

FIG.24

| | | | | | | |
|---|---|---|---|---|---|---|
| 1 | MAKER: | | | | | |
| | OBJECT NAME: | ∽ | | | | |
| | MANUFACTURE NO. | | △ | △ | △ | △ |
| | COLLECTION | YES · NO | | | | |
| | MONTHLY FEE (TAX EXCLUDED) | | △ | △ | △ | △ YEN |
| | MAINTENANCE FEE EACH TIME (TAX EXCLUDED) | | △ | △ | △ | △ YEN |
| 2 | MAKER: | | | | | |
| | OBJECT NAME: | ∽ | | | | |
| | MANUFACTURE NO. | | △ | △ | △ | △ |
| | COLLECTION | YES · NO | | | | |
| | MONTHLY FEE (TAX EXCLUDED) | | △ | △ | △ | △ YEN |
| | MAINTENANCE FEE EACH TIME (TAX EXCLUDED) | | △ | △ | △ | △ YEN |
| 3 | MAKER: | | | | | |
| | OBJECT NAME: | ∽ | | | | |
| | MANUFACTURE NO. | | △ | △ | △ | △ |
| | COLLECTION | YES · NO | | | | |
| | MONTHLY FEE (TAX EXCLUDED) | | △ | △ | △ | △ YEN |
| | MAINTENANCE FEE EACH TIME (TAX EXCLUDED) | | △ | △ | △ | △ YEN |

FORM TEMPLATE DEFINITION METHOD AND FORM TEMPLATE DEFINITION APPARATUS

BACKGROUND OF THE INVENTION

1. Field of the Invention

The present invention relates to form recognition, and more particularly relates to an apparatus and a method for defining a form template.

2. Description of the Related Art

Form recognition has many applications in the field of collecting and analyzing information by employing forms. It is possible to digitalize, store and send handwriting or printed data by utilizing the form recognition. An example of the application of the form recognition is one used in banks where there are a lot of forms needing to be dealt with; however, types of the forms are not too many, i.e., there are a large number of forms having the same types, for example, a remittance form, a withdrawal form, etc. In this case, as long as templates of the forms can be recognized, it is possible to cause an application program to find meaningful contents in suitable areas of the forms, for example, names of users, card numbers, etc. As a result, a definition of a form template is the first step of the form recognition.

In general, the form template informs a form processing application program about where the meaningful data are able to be extracted, how to extract the meaningful data, arrangement of texts in cells of a form, how to select a proper Optical Character Recognition (OCR) engine, etc.

Form Template Definition (FTD) is mainly used to determine attributes of the cells. The attributes of the cells includes but not limited to types of languages of the texts in the cells, for example, Chinese, Japanese, etc.; whether characters or Arabic numerals are able to be input; properties of layout, for example, one line or plural lines, one character string or one numeral, etc.; properties of lines forming the cells, for example, solid lines or dotted lines, rectangle-shaped lines or U-shaped lines, etc.; and whether the texts are those mixed of, for example, Simplified Chinese and Traditional Chinese, Chinese and Japanese, characters and numerals, etc.

In U.S. Pat. No. 5,317,646, a form recognition system is disclosed, wherein, a method of assisting an operator to create an electronic template is introduced. The operator uses a pointing device to select individual points located in closed boundaries or semi-closed boundaries on a displayed image; in this way, coordinates expressing the closed boundaries or the semi-closed boundaries are automatically determined by utilizing the individual points selected by the operator. However, in this patent specification, only how to determine positions of cells in a form is discussed, i.e., attributes of the cells are not involved; aside from this, the operator needs to artificially provide one point in a process of determining the positions of the cells.

In conventional techniques, operations for determining attributes of cells in a form usually are artificially defining the attributes of all of the cells in the form one by one. That is, the amount of work of a user is too large, and there are a lot of repeated definition operations; as a result, the user may get weary very easily.

SUMMARY OF THE INVENTION

In order to overcome the disadvantages of the prior art, the present invention provides a form template definition method and a form template definition apparatus able to reduce the amount of work of a user when the user deals with a form.

According to an embodiment of the present invention, a form template definition method is provided. The form template definition method comprises a cell extraction step of analyzing an image of a form so as to extract one or more cells from the image of the form; a cell classification step of classifying the extracted cells; and a cell attribute definition step of defining attributes of the extracted cells class by class, wherein, if an attribute of a first cell in a class is defined, then other cells in the class automatically copy the attribute of the first cell.

According to another embodiment of the present invention, a form template definition method is provided. The form template definition method comprises a cell extraction step of analyzing an image of a form so as to extract one or more cells from the image of the form; a predetermined mark recognition step of recognizing one or more predetermined marks from the extracted cells; and a cell attribute definition step of defining attributes of the extracted cells having the predetermined marks by using predetermined attributes of the extracted cells, associated with the recognized predetermined marks.

According to still another embodiment of the present invention, a form template definition method is provided. The form template definition method comprises a first form image obtaining step of obtaining a first form image of a form; a predetermined mark labeling step of labeling one or more cells in the form with one or more predetermined marks, wherein, attributes of the cells wait for definition, and the predetermined marks are associated with one or more predetermined attributes of the cells; a second form image obtaining step of obtaining a second form image of the labeled form; a cell extraction step of analyzing the first form image so as to automatically extract cells from the first form image; a predetermined mark recognition step of obtaining a difference image between the first form image and the second form image, and then recognizing the predetermined marks based on the difference image; and a cell attribute definition step of defining attributes of the extracted cells having the predetermined marks by using one or more predetermined attributes of the extracted cells, associated with the recognized predetermined marks.

Furthermore, according to an embodiment of the present invention, a form template definition apparatus is provided. The form template definition apparatus comprises a cell extraction unit for analyzing an image of a form so as to extract one or more cells from the image of the form; a cell classification unit for classifying the extracted cells; and a cell attribute definition unit for defining attributes of the extracted cells class by class, wherein, if an attribute of a first cell in one class is defined, then other cells in the class automatically copy the attribute of the first cell.

According to another embodiment of the present invention, a form template definition apparatus is provided. The form template definition apparatus comprises a cell extraction unit for analyzing an image of a form so as to extract one or more cells from the image of the form; a predetermined mark recognition unit for recognizing one or more predetermined marks from the extracted cells; and a cell attribute definition unit for defining attributes of the extracted cells having the predetermined marks by using predetermined attributes of the extracted cells, associated with the recognized predetermined marks.

According to still another embodiment of the present invention, a form template definition apparatus is provided. The form template definition apparatus comprises a first form image obtaining unit for obtaining a first form image of a form; a predetermined mark labeling unit for labeling one or more cells in the form with one or more predetermined marks, wherein, attributes of the cells wait for definition, and the predetermined marks are associated with one or more predetermined attributes of the cells; a second form image obtaining unit for obtaining a second form image of the labeled form; a cell extraction unit for analyzing the first form image so as to automatically extract cells from the first form image; a predetermined mark recognition unit for obtaining a difference image between the first form image and the second form image, and then recognizing the predetermined marks based on the difference image; and a cell attribute definition unit for defining attributes of the extracted cells having the predetermined marks by using one or more predetermined attributes of the extracted cells, associated with the recognized predetermined marks.

By employing the above-mentioned form template definition method and form template definition apparatus, when defining attributes of cells in a form class by class, it is only necessary to define an attribute of one cell in one class; as a result, the work amount of form template definition may be dramatically reduced.

In addition, by employing the above-mentioned form template definition method and form template definition apparatus, it is possible to automatically give predetermined attributes associated with predetermined marks to cells in a form, having the predetermined marks by setting the predetermined marks into the cells in advance; as a result, the work amount of form template definition may be considerably reduced.

BRIEF DESCRIPTION OF THE DRAWINGS

FIG. 1 is a block diagram of a functional arrangement of a form template definition apparatus according to an embodiment of the present invention.

FIG. 2 is a block diagram of a functional arrangement of a form template definition apparatus according to another embodiment of the present invention.

FIG. 5 illustrates an example of an image of a typical form.

FIG. 6 illustrates all cells in the form shown in FIG. 5.

FIG. 12 illustrates a method of dividing the 9 intersectional types shown in FIG. 11 into 4 corner classes.

FIG. 16 illustrates a result obtained by carrying out an automatic cell extraction operation with regard to the image of the form shown in FIG. 5 according to an embodiment of the present invention.

FIG. 20 illustrates an algorithm for determining whether two cells are similar by employing a comparison based on images in STEP 1704 of FIG. 17 according to an embodiment of the present invention.

FIG. 21 illustrates similar cells determined by using STEP 1704 of FIG. 17 according to an embodiment of the present invention.

FIG. 22 illustrates similar cells determined by using STEP 1705 of FIG. 17 according to an embodiment of the present invention.

FIG. 23 illustrates an example of an image of a standard form having predetermined marks.

FIG. 24 illustrates a case of labeling cells waiting for attribute definition with predetermined marks.

DETAILED DESCRIPTION OF THE PREFERRED EMBODIMENTS

Figure 3:
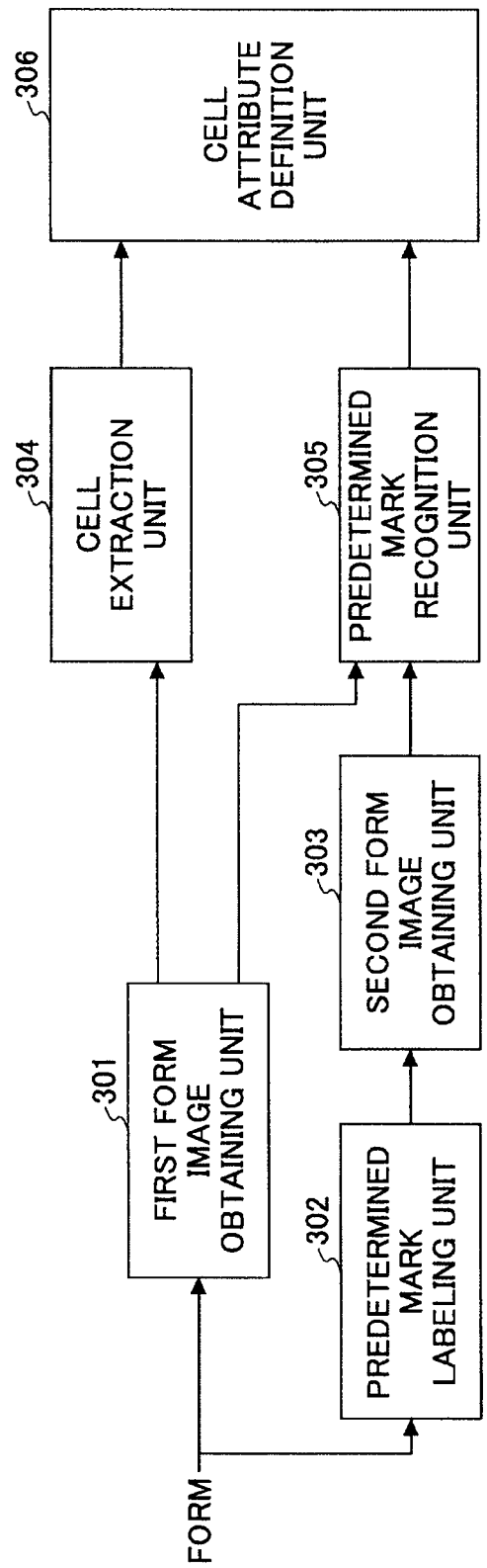
FIG. 3 is a block diagram of a functional arrangement of a form template definition apparatus according to still another embodiment of the present invention.

Hereinafter, various embodiments of the present invention will be concretely described with reference to the drawings.

Before concretely describing the embodiments of the present invention, in order to understand them easily, a few basic concepts of the present invention are described first. The present invention is proposed based on the following three aspects: (1) it is possible to automatically extract one or more cells in a normal form without artificial operations, (2) in many forms, there are a lot of cells having the same attributes, and (3) during a process of form template definition, some fixed attributes are usually applied to many forms, for example, one of the fixed attributes is that only Arabic numerals can be input. With regard to the above-mentioned three aspects, ways of responding are as follows: (1) since boundaries of most of cells in a form are formed of straight lines, it is possible to obtain all the horizontal and vertical straight lines by scanning the form; then, by analyzing an intersectional relationship of these straight lines, it is possible to automatically extract the cells so as to obtain positions the cells, (2) it is possible to classify the cells by considering heights, widths, contents, neighbors, and the like of the cells; as a result, when carrying out the form template definition, it is only necessary to define one cell belonging to the same class, i.e., attributes of other cells belonging to the same class may be obtained by automatically copying the attribute of the cell, and (3) with regard to some fixed attributes, it is possible to represent them by using predetermined marks, for example, a character "N" may be used to express that only numbers can be input into the cells; in this way, for example, by drawing the predetermined marks on a paper form, it is possible to recognize the predetermined marks after the paper form becomes an image, and then it is possible to rapidly set the attributes of the cells based on the predetermined marks.

FIG. 1 is a block diagram of a functional arrangement of a form template definition apparatus 100 according to an embodiment of the present invention.

As shown in FIG. 1, the form template definition apparatus 100 comprises a cell extraction unit 101 used to analyze an image of a form and to extract one or more cells from the image of the form; a cell classification unit 102 used to classify the extracted cells; and a cell attribute definition unit 103 used to define attributes the extracted cells class by class, wherein, if the attribute of a first cell in a class is defined, then other cells belonging to this class automatically copy the attribute of the first cell.

Here it should be noted that a form serving as a processing object may be an initially blank one, and also may be a completed one. And with regard to a cell in the form, as known in the art, it is the minimum unit forming the form. In general, a cell is a rectangle frame, but the present invention is not limited to this; for example, a U-shaped frame having an upper opening may also form the cell. However, in order to illustrate easily, the cell in the following description is illustrated by using a rectangle frame.

Furthermore, with regard to the image of the form, it may be an image obtained by utilizing a scanner, a camera, a digital imaging device, or the like.

In cells forming a form, in general, not all of the cells need to be dealt with; that is, maybe only some of the cells are objects of concern. For example, in a form shown in FIG. 5, with regard to cells 501, 502, and 504, although they are all cells, the cell 501 usually is not an object of concern; in other words, maybe only the blank cells 502 and 504 are objects waiting for being dealt with, i.e., objects of real concern so as to be extracted purposely. Here it should be noted that since application fields and processing aims are different, cells of concern are different, and maybe all of the cells are those whose attributes need to be defined.

FIG. 6 illustrates all cells in the form shown in FIG. 5 by using bold lines.

With regard to the cell extraction operation of the cell extraction unit 101 shown in FIG. 1, it may be carried out by hand; for example, positions of the cells may be manually designated. Of course they may also be automatically carried out by an information processing device such as a computer or the like. There are many conventional methods of automatically extracting a form, for example, *A Robust Method for Unknown Forms Analysis* (Li Xingyuan, Wen Gao, David Doermann, and Weon-Geun Oh, Proc. of 5th International Conference on Document Analysis and Recognition, 1999); *Methodology of Automatic Extraction of Table-Form Cells* (Luiz Antonio Pereira Neves and Jacques Facon, Proc. of 13th Brazilian Symposium on Computer Graphics and Image Processing, 2000); *A Recursive Analysis for Form Cell Recognition* (Hiroshi Shinjo, Eiichi Hadano, Katsumi Marukawa, Yoshihiro Shima, and Hiroshi Sako, Proc. of 6th International Conference on Document Analysis and Recognition, 2001); and *Field Extraction Method from Existing Forms Transmitted by Facsimile* (Takashi Hirano, Yasuhiro Okada, and Fumio Yoda, Proc. of 6th International Conference on Document Analysis and Recognition, 2001). A process flow of automatically extracting cells in a form will be briefly described below by referring to FIG. 7.

Figure 7:
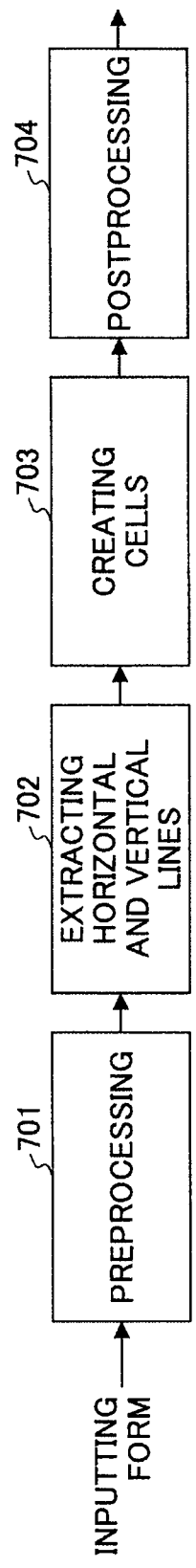
FIG. 7 illustrates a method of automatically extracting cells from a form according to an embodiment of the present invention.

Aside from this, the cell classification operation of the cell classification unit 102 shown in FIG. 1 may be total automatically carried out, i.e. without any artificial interference, and may also be carried out based on artificial interference. An example of the artificial interference is that an operator carries out the cell classification operation by clicking and selecting the cells. With regard to the automatic cell classification operation, it may be automatically carried out based on calculating similarity between any two cells, i.e., similar cells are classified into the same class. For example, it is possible to utilize a conventional grouping algorithm to group the respective cells severing as grouping objects. Here it should be noted that the conventional grouping algorithm may be, for example, a k-means grouping algorithm, a stage grouping algorithm, etc.; however, the present invention is not limited to these. In addition, when calculating the similarity between any two cells, it is possible to consider various aspects of the cells, for example, heights, widths, contents, neighbors (i.e. adjacent cells), etc. of the cells. FIG. 7 is a flowchart of a method of determining similarity between two cells in a form according to an embodiment of the present invention, and will be concretely illustrated below.

FIG. 7 illustrates a method of automatically extracting one or more cells from a form according to an embodiment of the present invention.

As shown in FIG. 7, in STEP 701, a preprocessing operation is applied to a form like that shown in FIG. 5. The preprocessing operation may include a binary image processing operation, an image deskewing operation, a line enhancement processing operation, etc.

In STEP 702, horizontal and vertical lines are extracted.

An algorithm for extracting the horizontal lines is as follows.

STEP 0: inputting a binary form image (it is supposed that background color is white, and foreground color is black) and three predetermined threshold values $T_1$, $T_2$, and $T_3$.

STEP 1: detecting all horizontal run lengths; this operation may be carried out by scanning the binary form image line by line from the above to the bottom. For example, if a horizontal continuous line formed of black pixels is found, then it is called a horizontal run length. In particular, if a value of a run length is greater than the first threshold value $T_1$, then this run length serves as the horizontal run length. The i-th horizontal run length is expressed as $(x_{si}, x_{ei}, y)$; here $x_{si}$ refers to a horizontal start position, $x_{ei}$ refers to a horizontal end position, and y refers to a vertical position.

STEP 2: combining the horizontal run lengths; in particular, with regard to any two horizontal run lengths $(x_{s1}, x_{e1}, y_1)$ and $(x_{s2}, x_{e2}, y_2)$, if min $(x_{e1}, x_{e2})$−max $(x_{s1}, x_{s2}) \geq T_2$ and $|y_1-y_2| \leq T_3$, then the two horizontal run lengths are determined as belonging to the same horizontal line. The horizontal run lengths belonging to the same horizontal line are combined into a horizontal line segment (i.e. a final horizontal line; in what follows, it is called a horizontal line sometimes) which is expressed as $(x_s, x_e, y)$; here $x_s$ refers to the leftmost horizontal coordinate of the combined horizontal line segment, $x_e$ refers to the rightmost horizontal coordinate of the combined horizontal line segment, and y refers to the vertical coordinate of the combined horizontal line segment.

The algorithm for extracting the final horizontal lines is given above; in the same way, it is possible to extract the final vertical lines (in what follows, they are called vertical lines sometimes).

Figure 8:
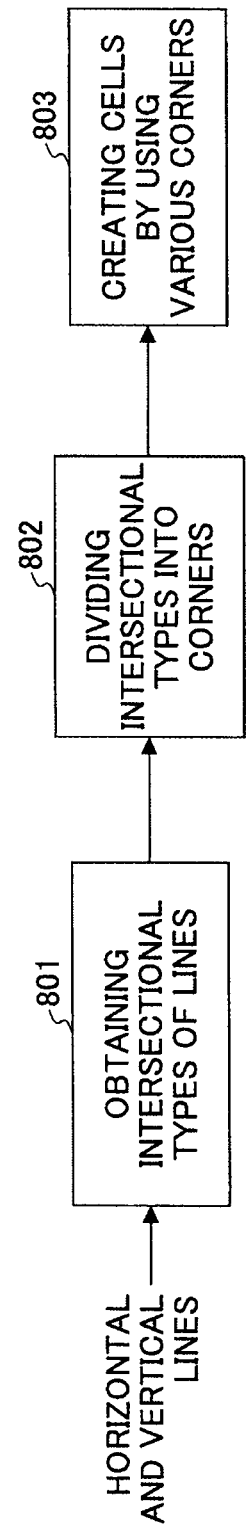
FIG. 8 illustrates a method of forming a cell by using horizontal and vertical lines according to an embodiment of the present invention.
Figure 9:
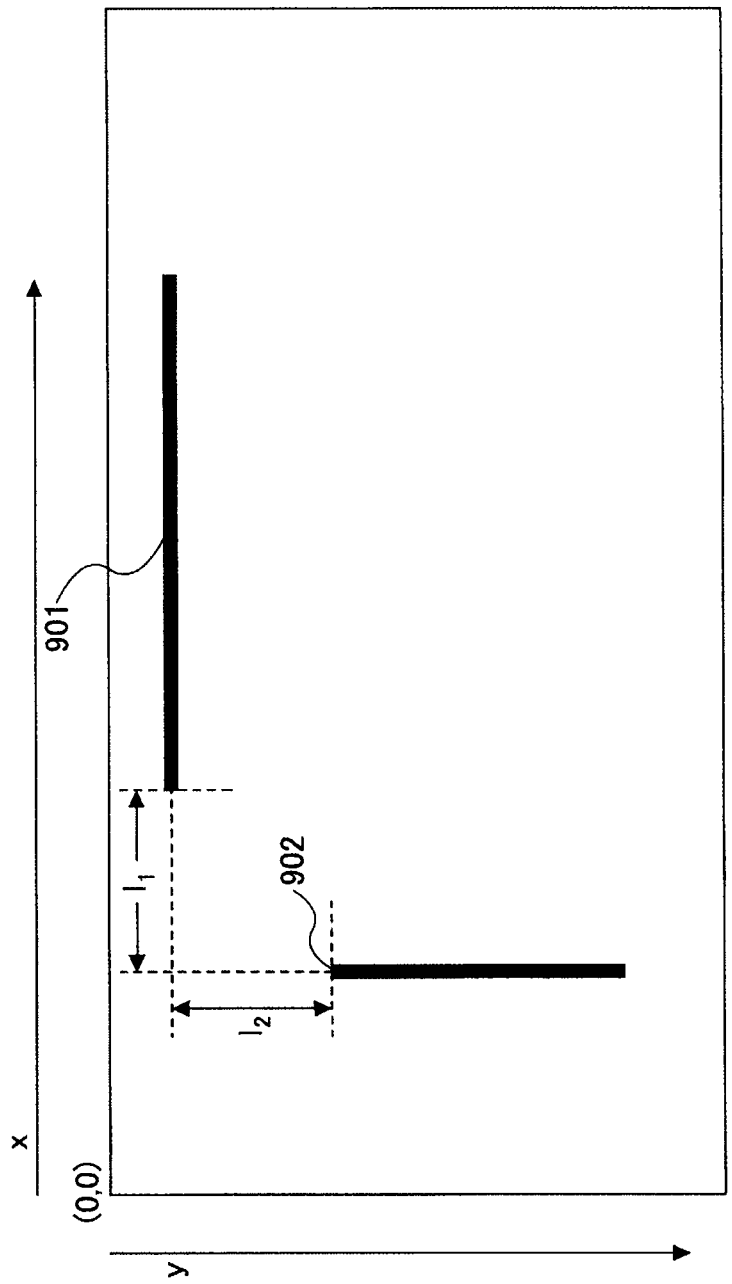
FIG. 9 illustrates a method of calculating distance between a horizontal line and a vertical line according to an embodiment of the present invention.

Then, in STEP 703, a cell is formed based on an intersectional relationship of the horizontal lines and the vertical lines. FIG. 8 illustrates a method of forming a cell by using horizontal lines and vertical lines according to an embodiment of the present invention. As shown in FIG. 8, in STEP 801, intersectional types of the horizontal lines and the vertical lines are obtained; in STEP 802, the obtained intersectional types are divided into various corners; and in STEP 803, the cell is formed by using the various corners. In general, a cell may be considered as being formed of four corners: an upper left corner, a lower left corner, an upper right corner, and a lower right corner; as a result, in order to form the cell, it is necessary to obtain and analyze the various corners. And in order to obtain and analyze the various corners, it is necessary to analyze an intersectional relationship of the horizontal lines and the vertical lines, i.e., whether the horizontal lines and the vertical lines intersect, and what the intersectional types of the horizontal lines and the vertical lines are. In order to do this, it is necessary to determine whether two lines (i.e. a horizontal line and a vertical line) intersect first. As an example that is not used to limit the present invention, a method of determining whether a horizontal line and a vertical line intersect is as follows: distance between the horizontal line and the vertical line is calculated, and the distance is compared with a predetermined threshold value; if the distance is less than the predetermined threshold value, then it is determined that these two lines intersect, whereas if the distance is greater than or equal to the predetermined threshold, then it is determined that these two line do not intersect. FIG. 9 illustrates a method of calculating distance between a horizontal line and a vertical line according to an embodiment of the present invention. As shown in FIG. 9, distance between a horizontal line 901 and a vertical line 902 is calculated as $l_1+l_2$.

Figure 10:
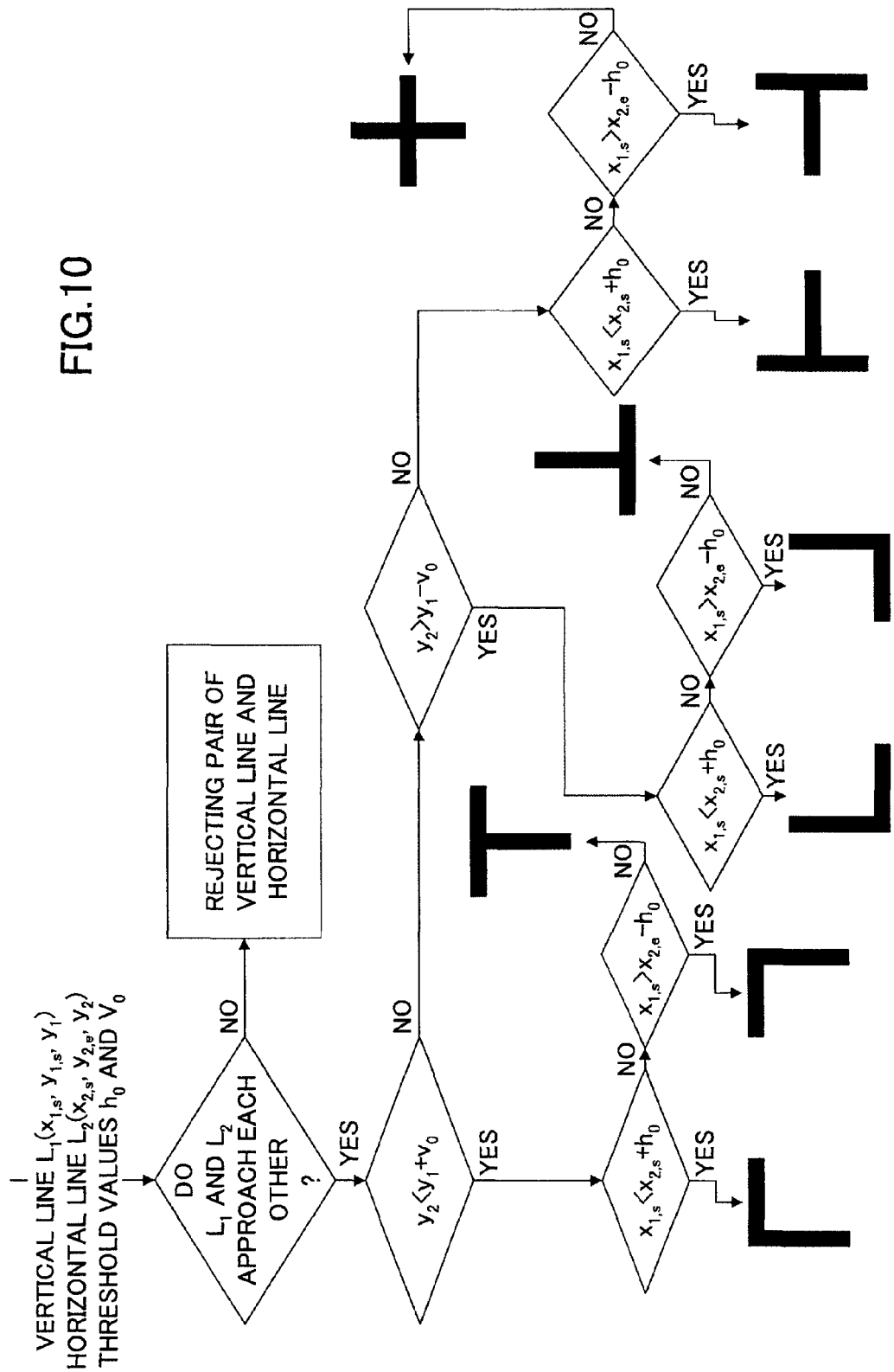
FIG. 10 illustrates a method of determining intersectional types of a horizontal line and a vertical line according to an embodiment of the present invention.
Figure 11:
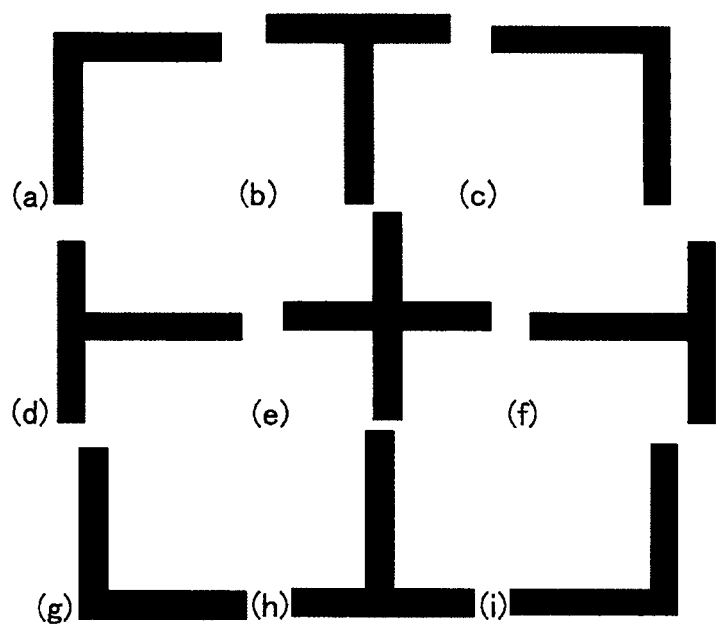
FIG. 11 illustrates 9 intersectional types generated by a horizontal line and a vertical line according to an embodiment of the present invention.

FIG. 10 illustrates a method of determining intersectional types of a horizontal line and a vertical line according to an embodiment of the present invention. FIG. 11 illustrates, with a 2-row and 2-column layout, 9 intersectional types generated by a horizontal line and a vertical line according to an embodiment of the present invention. As shown in FIG. 11, in order to understand easily, clearances between any two of the 9 intersections are illustrated; however, it should be noted that there are not these kinds of clearances in an actual layout.

FIG. 12 illustrates a method of dividing the 9 intersectional types into 4 corner classes. For example, a cross-type intersection may be divided into 4 corners; an L-type intersection may be only divided into a left-bottom corner; and a T-type intersection may be divided into an upper left corner and an upper right corner.

In particular, with regard to the cell forming operation by using the various corners shown in STEP 803 of FIG. 8, for example, it may be carried out as follows: selecting one upper left corner, one upper right corner, one lower left corner, and one lower right corner, and verifying whether the four corners can form a cell. It is possible to carry out the verifying operation by determining whether the four corners satisfy the following rules.

Figure 13A:
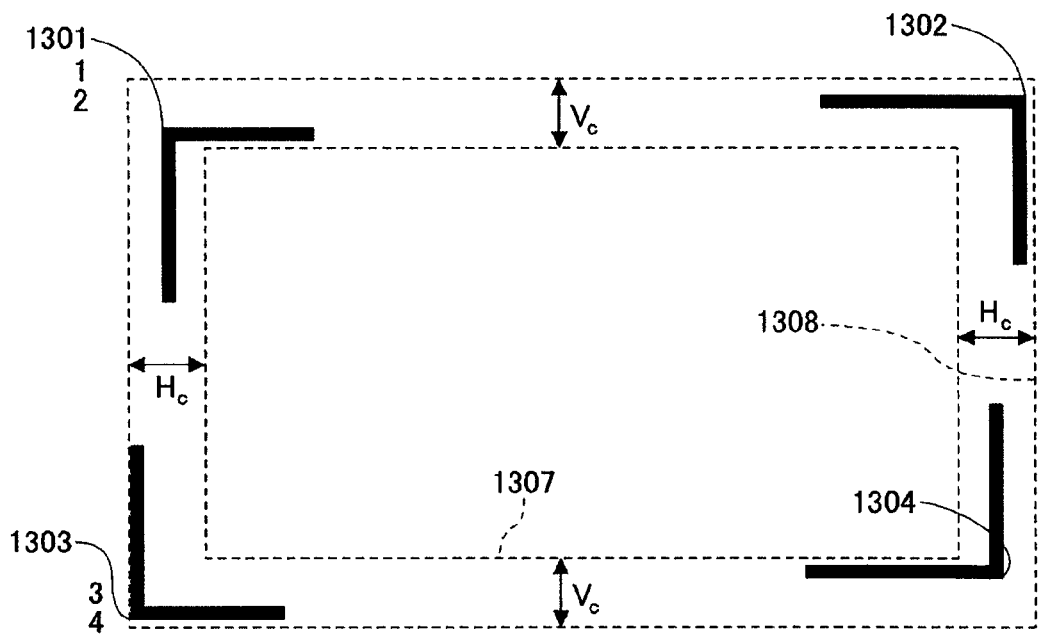
FIGS. 13A and 13B illustrate two rules for correctness verification according to an embodiment of the present invention.

(1) RULE 1: four corners are able to be disposed inside of an external rectangle and outside of an internal rectangle at the same time. FIG. 13A illustrates this rule. As shown in FIG. 13A, an internal rectangle is labeled as 1307, and an external rectangle is labeled as 1308. A horizontal clearance and a vertical clearance between the internal rectangle 1307 and the external rectangle 1308 are $H_C$ and $V_C$, respectively. Four corners, i.e., an upper left corner 1301, an upper right corner 1302, a lower left corner 1303, and a lower right corner 1304 are located between the internal rectangle 1307 and the external rectangle 1308. In other words, only a shift in the horizontal clearance $H_C$ and in the vertical clearance $V_C$ is permitted.

Figure 13B:
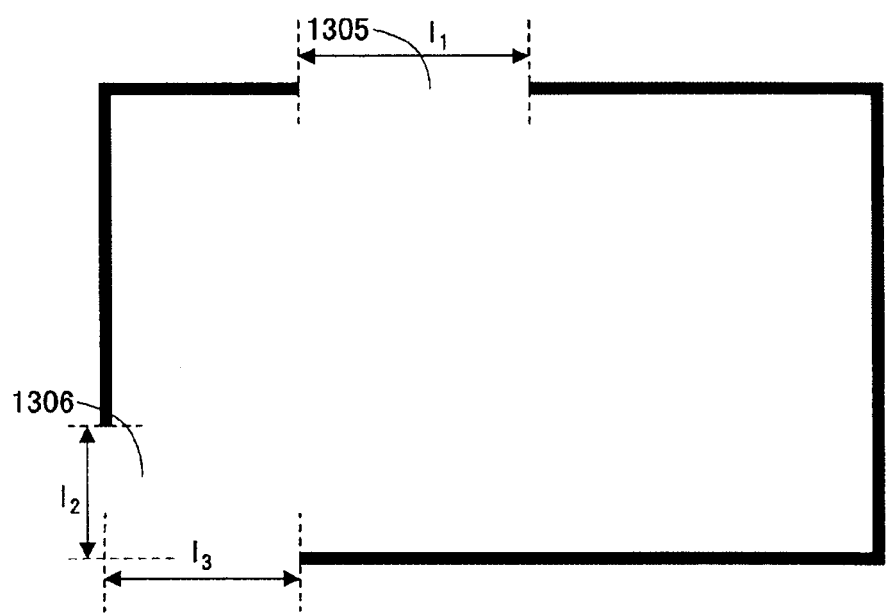

(2) RULE 2: if positions of the upper left corner 1301, the upper right corner 1302, the lower left corner 1303, and the lower right corner 1304 are expressed as coordinates of their corner points, i.e., $(x_1, y_1)$, $(x_2, y_2)$, $(x_3, y_3)$, and $(x_4, y_4)$, respectively, then position of the cell may be estimated as $((x_1+x_3)/2, (y_1+y_2)/2, (x_2+x_4)/2, (y_3+y_4)/2)$. Then length of at least one clearance is detected along the frame of the cell. FIG. 13B illustrates how to calculate lengths of two clearances 1305 and 1306; here the length of the clearance 1305 is $l_1$, and the length of the clearance 1306 is $l_2+l_3$. If the maximum value of the lengths of the clearances is greater than a predetermined threshold value, then RULE 2 is satisfied.

Of course, concrete details of the rules may be modified, or new rules may be added to verify whether four corners are able to form a cell.

Figure 14:
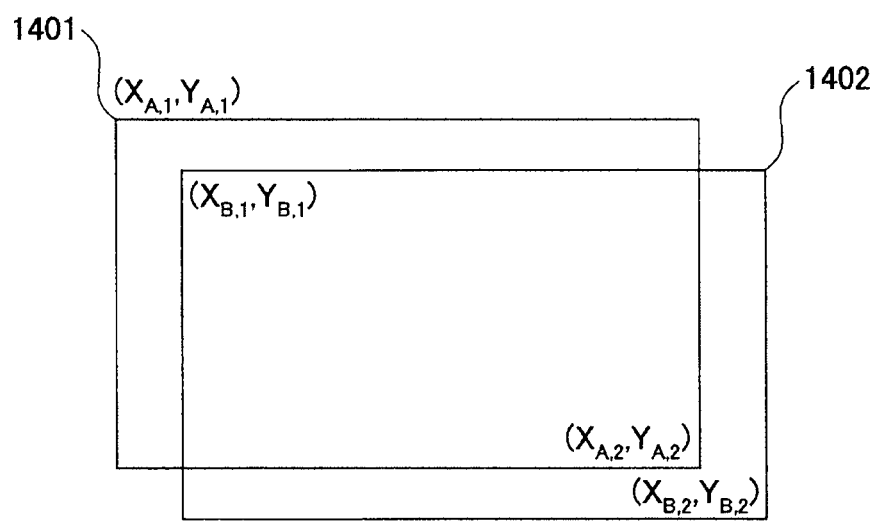
FIG. 14 illustrates two overlapping cells that should be dealt with in STEP 704 of FIG. 7 according to an embodiment of the present invention.

Next, after forming the cell in STEP 703 of FIG. 7, a postprocessing operation such as an operation for processing overlapping cells, etc., is carried out in STEP 704 (i.e. a postprocessing step). In some cases, maybe a few overlapping cells are created due to widths of lines, dotted or solid lines, etc.; however, actually these kinds of overlapping cells should correspond to one cell. FIG. 14 illustrates two overlapping cells.

Figure 15:
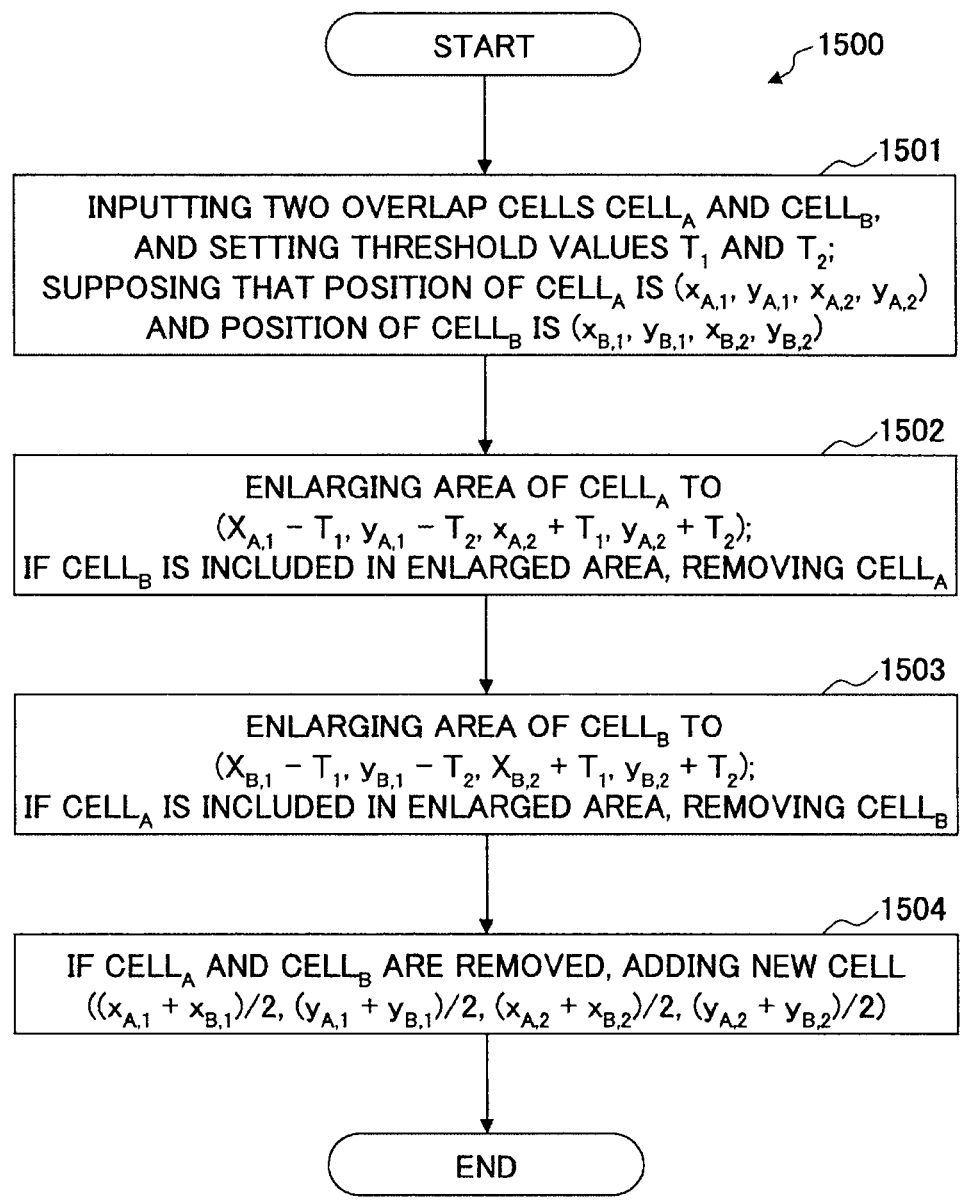
FIG. 15 illustrates an algorithm for dealing with the two overlapping cells that should be dealt with in STEP 704 of FIG. 7 according to an embodiment of the present invention.

FIG. 15 is a flowchart of an algorithm for dealing with the overlapping cells that should be dealt with in STEP 704 of FIG. 7.

As shown in FIG. 15, in STEP 1501, two overlapping cells $CELL_A$ and $CELL_B$ are input, and two threshold values $T_1$ and $T_2$ are set. Here it is supposed that the position of the cell $CELL_A$ is expressed as $(x_{A,1}, y_{A,1}, x_{A,2}, y_{A,2})$, and the position of the cell $CELL_B$ is expressed as $(x_{B,1}, y_{B,1}, x_{B,2}, y_{B,2})$.

In STEP 1502, with regard to the cell $CELL_A$, its area is enlarged to $(x_{A,1}-T_1, y_{A,1}-T_2, x_{A,2}+T_2, y_{A,2}+T_2)$; if the cell $CELL_B$ is included in the enlarged area, then the cell $CELL_A$ is removed.

In STEP 1503, with regard to the cell $CELL_B$, its area is enlarged to $(x_{B,1}-T_1, y_{B,1}-T_2, x_{B,2}+T_2, y_{B,2}+T_2)$; if the cell $CELL_A$ is included in the enlarged area, then the cell $CELL_B$ is removed.

In STEP 1504, if both the cell $CELL_A$ and the cell $CELL_B$ are removed, then a new cell $((x_{A,1}+x_{B,1})/2, (y_{A,1}+y_{B,1})/2, (x_{A,2}+x_{B,2})/2, (y_{A,2}+y_{B,2})/2)$ is added.

Up to here the method of extracting the cell has been described by referring to FIGS. 7~15. However, it should be noted that the above-mentioned method is just an example; in other words, as said above, there are many methods of extracting the cell in the conventional techniques, and these conventional methods may be applied to the embodiments of the present invention.

Figure 16:
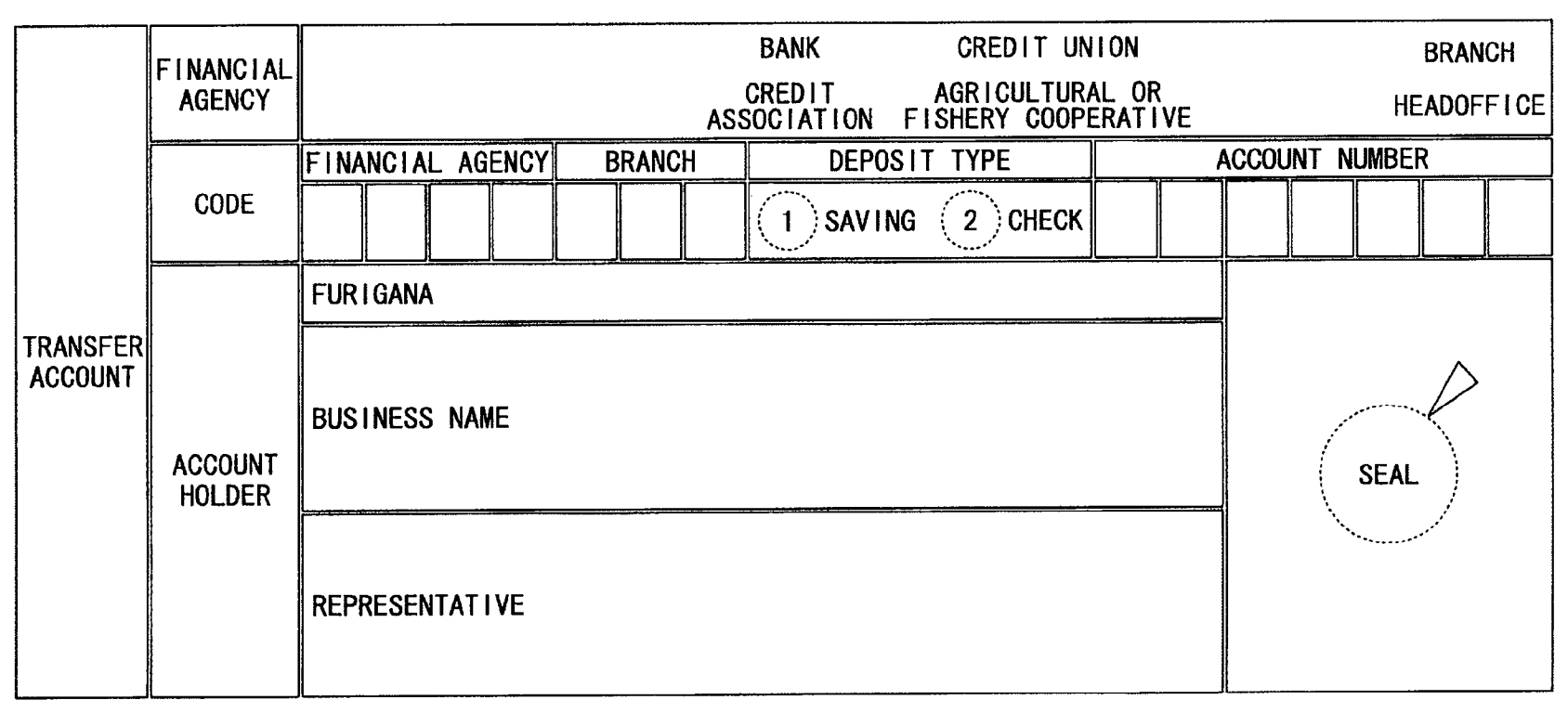

FIG. 16 illustrates a result obtained by carrying out automatic cell extraction processing with regard to the image of the form shown in FIG. 5, wherein, various cells are represented by bold frames.

Figure 17:
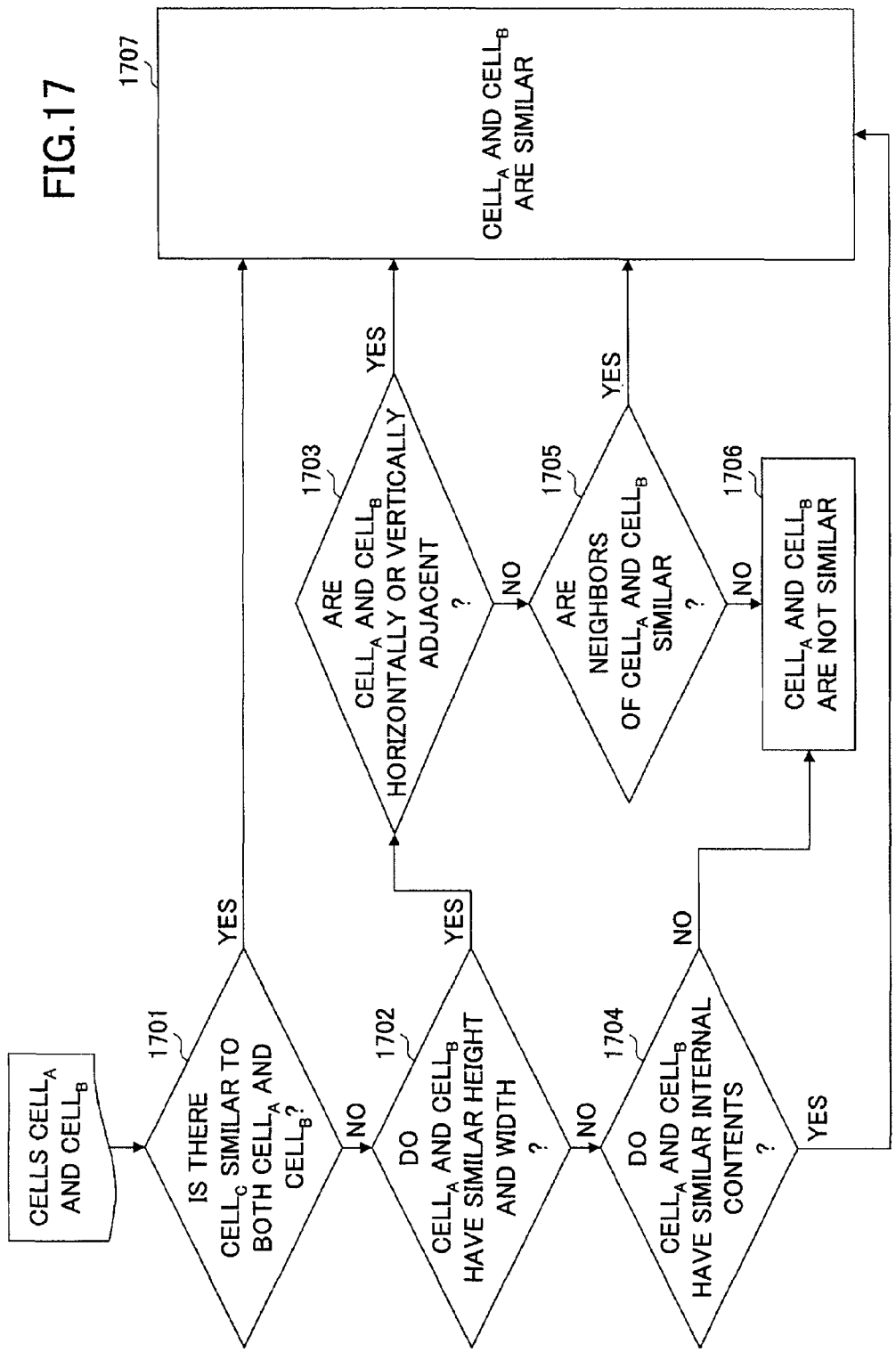
FIG. 17 is a flowchart of a method of determining similarity between two cells in a form according to an embodiment of the present invention.

FIG. 17 is a flowchart of a method, which may be applied to the cell classification operation shown in FIG. 1, for determining similarity between two cells in a form.

As shown in FIG. 17, in STEP 1701, it is determined that whether there is a cell $CELL_C$ that is similar to both a cell $CELL_A$ and a cell $CELL_B$; if there is the cell $CELL_C$, then the method goes to STEP 1707 to determine that the cell $CELL_A$ is similar to the cell $CELL_B$. In this step, if it has been determined that the cell $CELL_A$ is similar to the cell $CELL_C$ and the cell $CELL_B$ is similar to the cell $CELL_C$ in advance, then it is possible to directly determine that the cell $CELL_A$ is similar to the cell $CELL_B$. In other words, if the cell $CELL_A$ and the cell $CELL_C$ are classified as belonging to the same class, and the cell $CELL_B$ and the cell $CELL_C$ are classified as belonging to the same class too, then it is possible to directly determine that the cell $CELL_A$ and the cell $CELL_B$ belong to the same class. As a result, in this case, it is possible to omit the similarity determination operation with regard to the cell $CELL_A$ and the cell $CELL_B$ in the follow-on STEPS 1702-1705.

If it is determined that there is no any cell that is similar to both the cell $CELL_A$ and the cell $CELL_B$, the method goes to STEP 1702. In STEP 1702, it is determined that whether the cell $CELL_A$ and the cell $CELL_B$ are cells having similar height and width; if they are, then the method goes to STEP 1703 to determine that whether the $CELL_A$ and the cell $CELL_B$ are vertically or horizontally adjacent cells. If the determination result of STEP 1703 is YES, then the method goes to STEP 1707, i.e., determines that the cell $CELL_A$ is similar to the cell $CELL_B$.

If the determination result of STEP 1703 is NO, then the method goes to STEP 1705 to determine that whether adjacent cells of the cell $CELL_A$ and the cell $CELL_B$ are similar; if the adjacent cells of the $CELL_A$ and the cell $CELL_B$ are similar, then the method goes to STEP 1707, i.e., determines that the cell $CELL_A$ is similar to the cell $CELL_B$. If the determination result of STEP 1705 is NO, then the method goes to STEP 1706, i.e., determines that the cell $CELL_A$ is not similar to the cell $CELL_B$.

If the determination result of STEP 1702 is NO, then the method goes to STEP 1704. In STEP 1704, it is determined that whether the cell $CELL_A$ and the cell $CELL_B$ are cells having similar internal contents. If the determination result of STEP 1704 is YES, then the method goes to STEP 1707, i.e., determines that the cell $CELL_A$ is similar to the cell $CELL_B$; otherwise the method goes to STEP 1706, i.e., determines that the cell $CELL_A$ is not similar to the cell $CELL_B$.

Figures 18, 19:
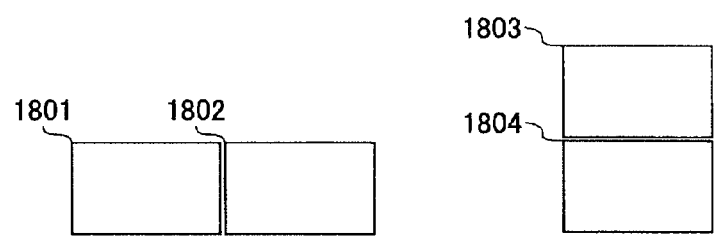
FIG. 18 illustrates two horizontally adjacent cells and two vertically adjacent cells according to an embodiment of the present invention.
FIG. 19 illustrates a result of classifying cells in a form by utilizing the method shown in FIG. 17.

FIG. 18 illustrates two horizontally adjacent cells and two vertically adjacent cells. If there is not any cell between a cell 1801 and a cell 1802, then it is considered that the cell 1801 is adjacent to the cell 1802; in the same way, it is considered that a cell 1803 is adjacent to a cell 1804. Furthermore if difference between the centers of the cells 1801 and 1802 along the vertical direction is less than a predetermined threshold value, then the cells 1801 and 1802 are considered as being horizontally adjacent. In the same way, if difference between the centers of the cells 1803 and 1804 along the horizontal direction is less than a predetermined threshold value, then the cells 1803 and 1804 are considered as being vertically adjacent.

FIG. 19 illustrates a result of classifying cells in a form by utilizing STEPS 1701-1703 of the method shown in FIG. 17, i.e., cells with bold frames are considered as being similar, and are classified to the same class.

Here it should be noted that with regard to the operation of determining whether the internal contents of two cells are similar, the internal contents refer to objects inside the two cells. It is possible to compare the extracted contents inside the two cells by carrying out character recognition or by carrying out a comparison at the level of images. In a case where the character recognition is applied, for example, the operation is recognizing the extracted objects by utilizing the character recognition and comparing the recognized results of the objects inside the cells; for example, if the number of the same characters inside the two cells is greater than a predetermined threshold value, or if the ratio of the same characters to all of the characters inside the two cells is greater than a predetermined threshold value, then it may be determined that the two cells are similar cells. In a case where the comparison at the level of images is applied, the operation can be carried out by comparing the respective pixels inside the two cells or by comparing areas made up of continuous pixels inside the two cells (for example, a horizontal line in a character). FIG. 20 illustrates an algorithm for comparing internal contents of two cells by utilizing a comparison at the level of image, wherein, areas made up of continuous pixels are extracted, and the respective areas are compared. FIG. 21 illustrates two similar cells obtained by determining whether internal contents inside the two cells are similar. As shown in FIG. 21, cells 2101 and 2105 are not similar based on the aspect of size; however, by utilizing the above-mentioned character recognition or the comparison at the level of image, it is possible to find that the internal contents inside the two cells are similar, i.e., it is possible to find that there are similar content pairs of 2102 and 2106, 2103 and 2107, and 2104 and 2108. As a result, it is determined that the cells 2101 and 2105 are similar cells.

With regard to the operation of determining whether the two cells are similar according to the similarity of their adjacent cells in STEP 1705, FIG. 22 illustrates an example based on this step. In FIG. 22, cells whose attributes wait for definition, belonging to the same class are represented by the same shadow. As shown in FIG. 22, cells 2201, 2202, and 2203 are similar based on the aspect of size, but they are not horizontally or vertically adjacent, and do not include any internal contents. However, by using another step in FIG. 17, it is possible to determine that adjacent cells of the cells 2201, 2202, and 2203 are similar; for example, cells on the right side of the cells 2201, 2202, and 2203 can be determined as belonging to the same class by using the operation of STEP 1704. As a result, according to the similarity of the adjacent cells of the cells 2201, 2202, and 2203, it is possible to determine that the cells 2201, 2202, and 2203 are similar.

By employing the above-mentioned method of defining the attributes of the cells in the respective classes based on the classification of the cells according to the embodiments of the present invention, it is possible to automatically achieve the attribute definition of all the cells in one class by defining the attribute of only one cell in the class; as a result, the work amount of a user may be dramatically reduced.

Furthermore, after or during a process of defining the form template, with regard to whether the classification of the cells is correct, it is possible to verify by the user; if a mistake is found, the user may make a modification.

In addition, after or during the process of defining the form template, if it is necessary to change or correct the attribute definition of the cells in one class, the user may change or correct the attribute definition in units of classes, i.e., if the attribute definition of any cell in the class is changed or corrected, the corresponding attribute definition of other cells in the class is automatically changed or corrected. Therefore it is apparent that this may dramatically reduce the work amount of the follow-on form template maintenance operation. Of course, the user may also choose a way of changing or correcting the attribute definition of the cells in units of cells instead of in units of classes, i.e., modification made to the attribute definition of one cell cannot influence the attribute definition of other cells in the same class. In addition, the user may choose a way of changing or correcting the attribute definition of some classes in units of classes, and changing or correcting the attribute definition of other classes in a unit of cell. These ways may be applied to the embodiments of the present invention according to actual demand.

In what follows, a form template definition apparatus according to an embodiment of the present invention is illustrated by referring to FIG. 2. In this form template definition apparatus, marks predetermined in cells of a form are utilized; the reason is that there may be many cells having a fixed and usually-repeated attribute. For example, with regard to a manufacture code, it is a number in general; in this case, the user can use a predetermined mark such as "N" to express that the attribute of a cell is that only a number can be input in the cell. As a result, when carrying out attribute definition of the cell, if it is recognized that there is the predetermined mark "N" in the cell, then the attribute of the cell is automatically given as only a number can be input in the cell, i.e., it is not necessary to make the attribute definition by hand. FIG. 23 illustrates an image of a standard form having predetermined marks, wherein, aside form the mark "N", a mark "JT" refers to that any characters can be input in the corresponding cell, and a mark "Δ" refers to that only a single Arabic numeral can be input in the corresponding cell.

As shown in FIG. 2, a form template definition apparatus 200 includes a cell extraction unit 201 used to analyze an image of a form and extract one or more cells in the image of the form; a predetermined mark recognition unit 202 used to recognize one or more predetermined marks in the extracted cells; and a cell attribute definition unit 203 used to define the extracted cells having the predetermined marks by using predetermined attributes of cells associated with the predetermined marks. Here it should be noted that the above-mentioned "one or more predetermined marks in the extracted cells" and "the extracted cells having the predetermined marks" do not refer to that the predetermined mark and the extracted cells are always located on the same image; in other words, they may be located on different images. For example, as for an initial form, it is possible to obtain an initial image A by scanning the initial form, and then, after writing one or more predetermined marks onto the initial form, it is possible to obtain a reference image B by scanning the initial form having the predetermined marks; in order to deal with this easily, it is possible to extract cells from the initial image A and the predetermined marks from the reference image B, and then, by obtaining a positional correspondence relationship between the predetermined marks and the extracted cells, it is possible to give attributes associated with the predetermined marks to the cells located on the corresponding positions. However, although the cells are extracted from the initial image A and the predetermined marks are recognized from the reference image B, in order to illustrate conveniently, the above-mentioned "one or more predetermined marks in the extracted cells" and "the extracted cells having the predetermined marks" are still used hereinafter. Of course, it is also possible to directly carry out the cell extraction operation and the predetermined mark recognition operation with regard to one form image such as the reference image B. Furthermore the predetermined marks may be written onto a paper form by hand, or may be added onto an obtained digital image by utilizing a computer.

FIG. 3 illustrates a form template definition apparatus 300 for defining a form template by utilizing predetermined marks according to an embodiment of the present invention.

As shown in FIG. 3, the form template definition apparatus 300 includes a first form image obtaining unit 301 used to obtain a first form image of a form; a predetermined mark labeling unit 302 used to label cells in the form, waiting for an attribute definition with one or more predetermined marks, wherein, the predetermined marks are associated with predetermined attributes of the cells; a second form image obtaining unit 303 used to obtain a second form image of the labeled form; a cell extraction unit 304 used to analyze the first form image so as to automatically extract the cells from the first form image; a predetermined mark recognition unit 305 used to acquire a difference image between the first form image and the second form image, and then recognize the predetermined marks in the cells based on the difference image; and a cell attribute definition unit 306 used to define the extracted cells having the predetermined marks by using the predetermined attributes of the cells associated with the predetermined marks.

Here it should be noted that it is possible to label all of the cells waiting for attribute definition with the predetermined marks, or label only some of the cells with the predetermined marks. FIG. 24 illustrates a case of labeling cells waiting for attribute definition with predetermined marks.

Figure 4:
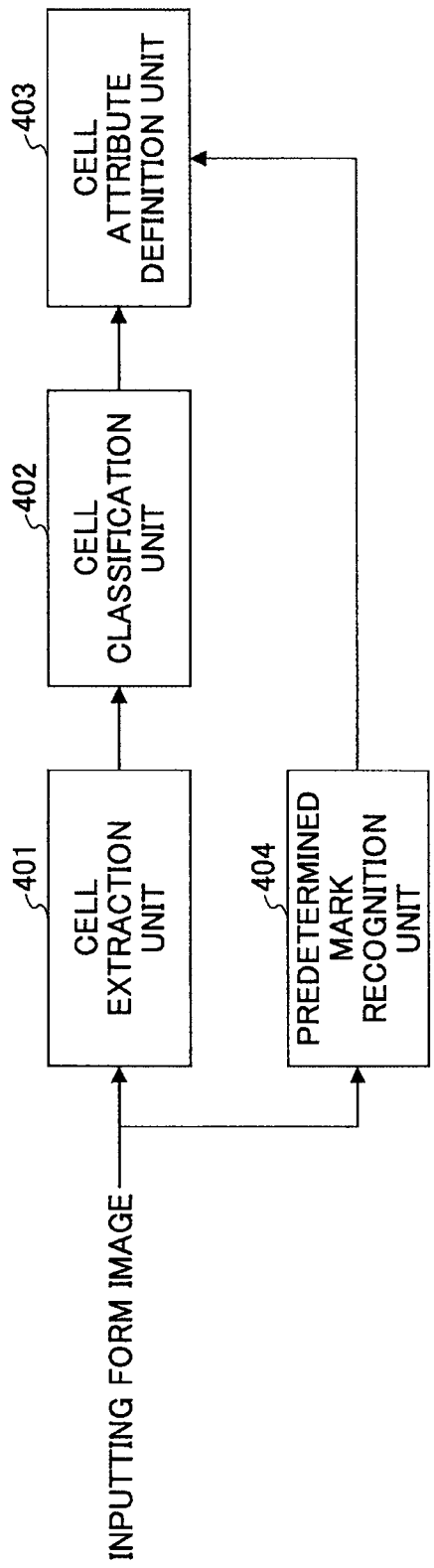
FIG. 4 is a block diagram of a functional arrangement of a form template definition apparatus according to still another embodiment of the present invention.

Furthermore it is possible to obtain a combined form template definition apparatus by combining the apparatus shown in FIG. 1 for defining the form template based on the classification with the apparatus shown in FIG. 2 for defining the form template based on the predetermined marks. FIG. 4 illustrates a combined form template definition apparatus according to an embodiment of the present invention. The difference between FIG. 4 and FIG. 1 is that a predetermined mark recognition unit 404 is further included in FIG. 4. The predetermined mark recognition unit 404 is used to recognize whether a first cell has a predetermined mark that is associated with a predetermined attribute of the cell; if it is recognized that the first cell has the predetermined mark, then the cell attribute definition unit 403 defines the first cell by using the predetermined attribute associated with the predetermined mark. That is, with regard to a class of cells, it is possible to add a predetermined mark to one cell in the class of cells, and then, during a process of a form template definition, if it is recognized that one cell in the class of cells has the predetermined mark, then this cell is defined by using a predetermined attribute associated with the predetermined mark, and then other cells in the class of cells are automatically defined. This kind of case is concretely illustrated by referring to FIG. 23 in what follows. In FIG. 23, cells belonging to the same class, waiting for attribute definition are represented by the same shadow. As shown in FIG. 23, cells 2301, 2304, and 2307 belong to the same class, and the cell 2301 is labeled with "JT" that means that the attribute of the cell 2301 is that any characters can be input therein. As a result, the attribute of the cell 2301 is automatically given to the cells 2304 and 2307 belonging to the same class; in other words, with regard to this attribute, it is not necessary to define the cells 2304 and 2307 again. In the same way, cells 2302, 2305, and 2308 belong to the same class, and the cell 2302 is labeled with "N"; as a result, after the cell 2302 is given a predetermined attribute, the cells 2305 and 2308 are automatically given this attribute. And as for cells 2303, 2306, and 2309, they are the same, i.e., the cells 2306 and 2309 are automatically given a predetermined attribute after this attribute is given to the cell 2303 that is labeled with "Δ".

Here it should be noted that although the predetermined marks in the above embodiments are represented as "JT", "N", and "Δ", it is also possible to use other marks such as color, etc. For example, with regard to the same character "N", if its color is black, then the attribute of the corresponding cell is that any characters can be input into this cell; if its color is red, then the attribute of the corresponding cell is that only a number can be input into this cell. Alternatively, if color of a cell frame is red, then this cell has a predetermined attribute corresponding to red color, for example, only Japanese can be input into this cell, etc. Furthermore various symbols such as "☆", "□", etc. or line types of cell frames such as a dot-dash-line, a wavy line, etc. may be used as the predetermined marks.

By using the proposal of defining the form template attributes based on the predetermined marks, it is possible to reduce the work amount of the user. Furthermore, by using the proposals of defining the form template attributes based on the predetermined marks and based on the classification, it is possible to combine the advantages of the two so as to further reduce the work amount of the user.

Figure 25:
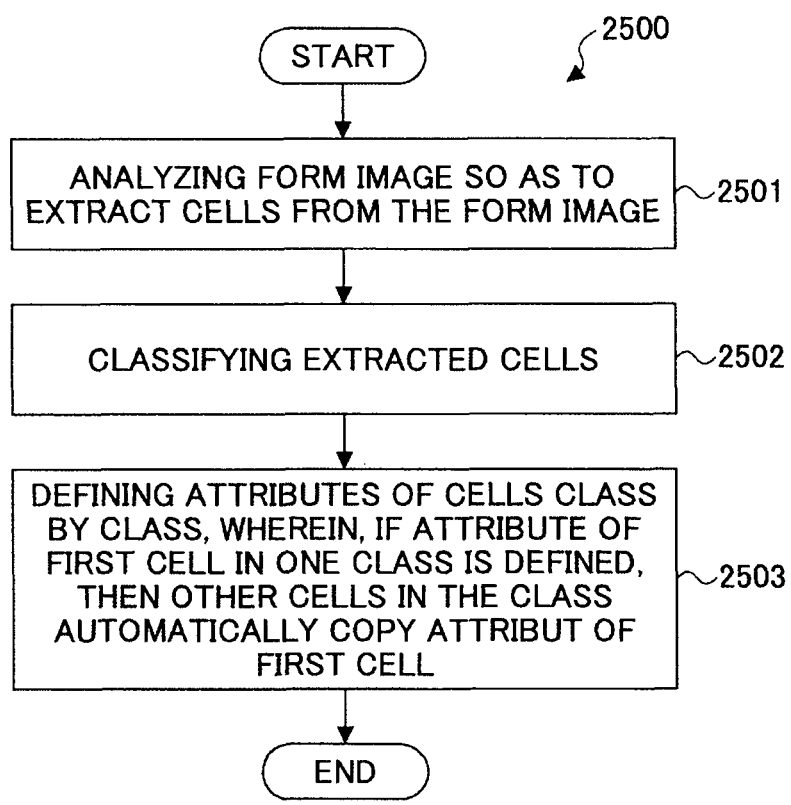
FIG. 25 is a flowchart of a method of defining a form template according to an embodiment of the present invention.

FIG. 25 is a flowchart of a method 2500 of defining a form template according to an embodiment of the present invention. The method 2500 includes STEP 2501 of analyzing an image of a form so as to extract one or more cells from the image of the form; STEP 2502 of classifying the extracted cells; and STEP 2503 of defining attributes of the extracted cells class by class, wherein, if the attribute of a first cell in one class is defined, then other cells in the class automatically copy the attribute of the first cell. Preferably, in STEP 2503, the attribute of the first cell may be defined by a step of recognizing whether there is a predetermined mark in the first cell, wherein, the predetermined mark is associated with a predetermined attribute of the cell; if it is recognized that there is the predetermined mark in the first cell, then the first cell is defined by using the predetermined attribute associated with the predetermined mark. Further preferably, the step of recognizing whether there is the predetermined mark in the first cell includes a step of obtaining a difference image between a form image in which the predetermined marks are not set and a form image in which the predetermined marks are set, and comparing the difference image with the predetermined marks. Furthermore, after the attributes of the cells in one class are defined, preferably it is possible to change the attribute of any cell in the class, and at the same time, the attributes of other cells in the class are automatically changed correspondently. In addition, in STEP 2502, the classification of the extracted cells may be automatically carried out based on the similarity calculation of the extracted cells.

Figure 26:
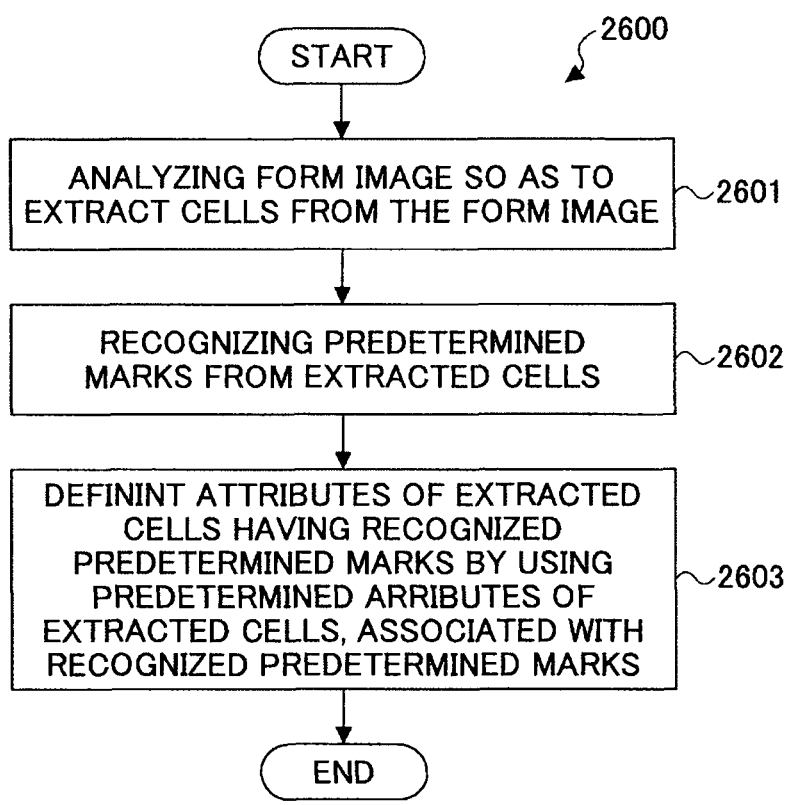
FIG. 26 is a flowchart of a method of defining a form template according to another embodiment of the present invention.

FIG. 26 is a flowchart of a method 2600 of defining a form template according to an embodiment of the present invention. The method 2600 includes STEP 2601 of analyzing an image of a form so as to extract one or more cells from the image of the form; STEP 2602 of recognizing one or more predetermined marks included in the extracted cells; and STEP 2603 of defining the extracted cells having the predetermined marks by using one or more predetermined attributes of the cells associated with the recognized predetermined marks.

Figure 27:
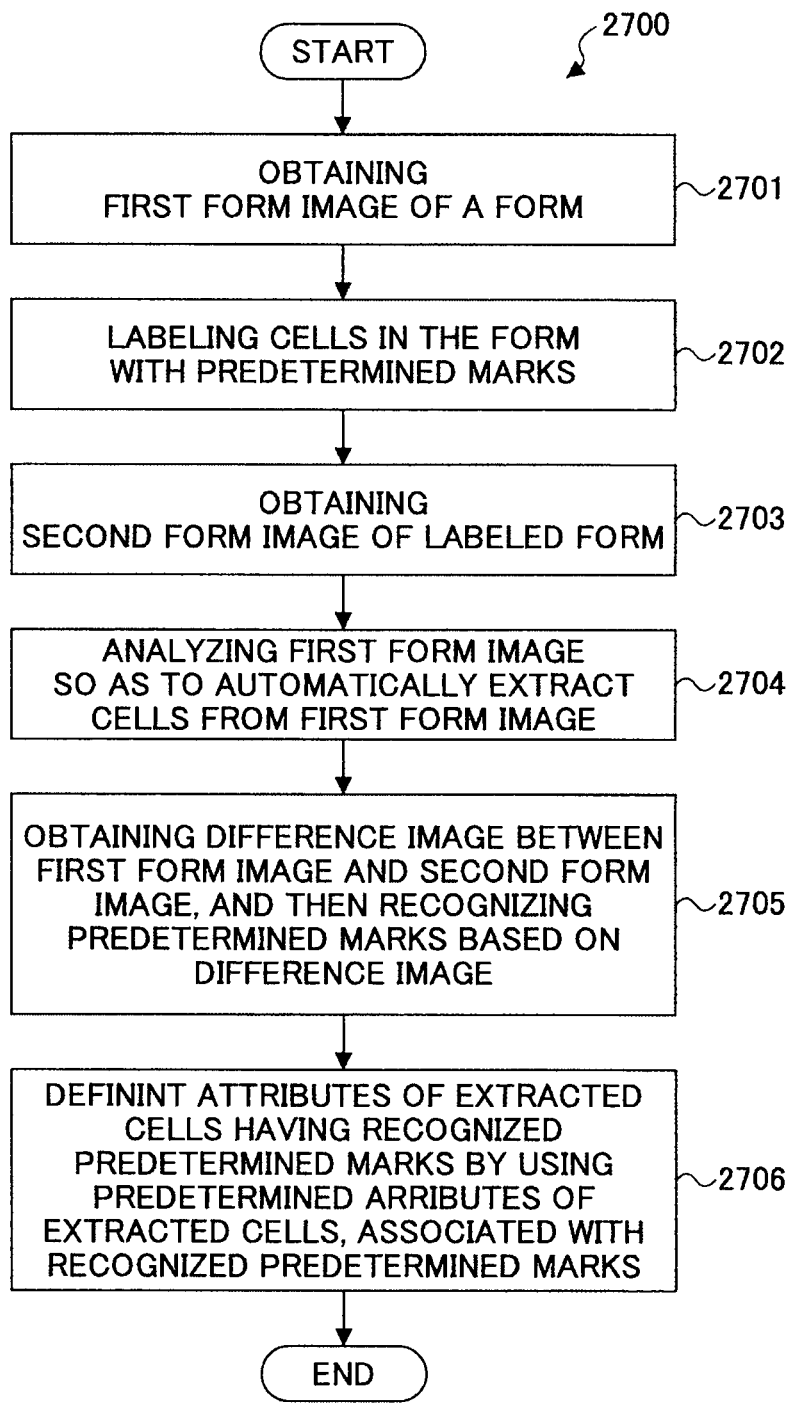
FIG. 27 is a flowchart of a method of defining a form template according to still another embodiment of the present invention.

FIG. 27 is a flowchart of a method 2700 of defining a form template according to an embodiment of the present invention. The method 2700 includes STEP 2701 of obtaining a first form image of a form; STEP 2702 of labeling one or more cells in the form, waiting for attribute definition with one or more predetermined marks, wherein, the predetermined marks are associated with one or more predetermined attributes of the cells; STEP 2703 of obtaining a second form image of the labeled form; STEP 2704 of analyzing the first form image so as to automatically extract the cells from the first form image; STEP 2705 of obtaining a difference image between the second form image and the first form image, and then recognizing the predetermined marks in the extracted cells based on the difference image; and STEP 2706 of defining the extracted cells having the recognized predetermined marks by using the predetermined attributes of the cells associated to the recognized predetermined marks.

Here it should be noted that orders of the respective steps or the respective units in the drawings does not stand for that the respective steps or the respective units have to be carried out or arranged according to the orders except there is an inevasible interdependent relationship among them. For example, the order between STEP 2601 of extracting the cells and STEP 2602 of recognizing the predetermined marks as shown in FIG. 26 may be set arbitrarily.

Figure 28:
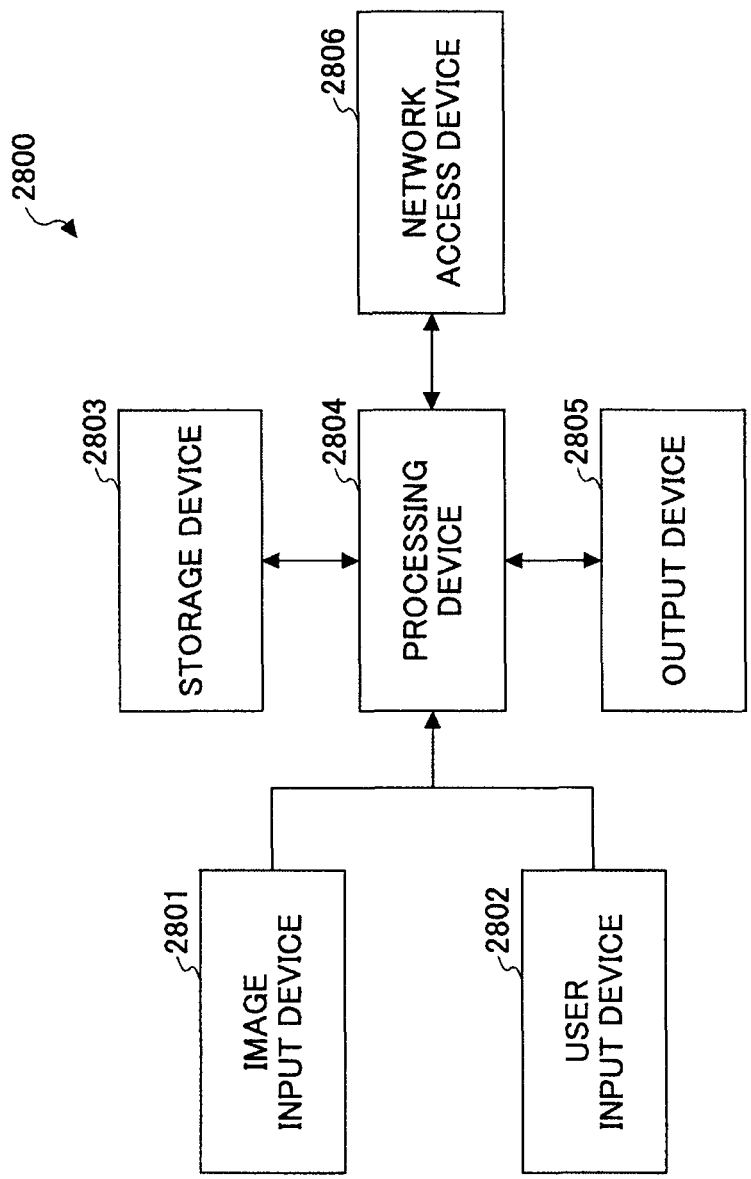
FIG. 28 is a block diagram of a computer system according to an embodiment of the present invention.

FIG. 28 is a block diagram of a computer system 2800 according to an embodiment of the present invention. The computer system 2800 typically includes an image input device 2801, a user input device 2802, a storage device 2803, a processing device 2804, an output device 2805, and a network access device 2806. The number of the processing devices 2804 may be one or plural. The storage device 2803 may be a random access memory (RAM), a high speed buffer in a processing unit, a configured virtual memory, or any other additional memories. The image input device 2801 may include a digital camera, a scanner, or any other devices able to capture image-forming signals. The user input device 2802 may include a keyboard, a mouse, a touch pad, or any other devices able to input user instructions. The computer system 2800 shown in FIG. 28 may include one or more of the network access devices 2806, wherein, for example, networks may be a local area network (LAN), a wide area network (WAN), a wireless network, etc., used to send or receive information to or from other systems. It is possible to transfer image data, instructions, applications, etc., via the networks; aside from this, it is also possible to send an interim result or a final result to remote computers. The output device 2805 may include a display device, a printing device, or any other devices able to store or transfer a form definition result.

Here it should be noted that the embodiments of the present invention may be realized by hardware, software, firmware, or a combination of them, and may be embodied as a computer program or a computer-readable medium; however, the technical scope of the present invention is not limited by these kinds of approaches.

Furthermore the processing functions in the above embodiments of the present invention may be achieved by a computer. In this case, a program for describing a processing process of a file management device and a file transfer device is provided. By using the computer to execute the program, it is possible to cause the computer to achieve the above-mentioned functions. In addition, it is possible to record the program for describing the processing process into a computer-readable medium. The computer-readable medium may include a semiconductor or solid state storage, a magnetic tape, a removable computer magnetic disk, a random access memory (RAM), a read-only memory (ROM), a hard disk, an optical disk, a magnetic optical disk, or the like.

In order to distribute the program, for example, it is possible to utilize a movable recording medium such as an optical disk able to store the program. Alternatively the program may be stored in a memory unit of a server, and may be transferred from the server to other computers via the networks.

Furthermore the computer used to execute the program may store the program that is recorded in a movable medium or transferred from a server into a storage unit therein. And then the computer reads the program from the storage unit and carries out processing according to the program.

In addition, it should be noted that connections between various elements (units) in the embodiments of the present invention do not limit the technical scope of the present invention, and one or more elements may include or connect to other elements.

While the present invention is described with reference to the specific embodiments chosen for purpose of illustration, it should be apparent that the present invention is not limited to these embodiments, but numerous modifications could be made thereto by those skilled in the art without departing from the basic concepts and scope of the present invention.

The present application is based on Chinese Priority Patent Application No. 201010121993.X filed on Mar. 11, 2010, the entire contents of which are hereby incorporated by reference.

What is claimed is:

1. A form template definition method comprising:
 a cell extraction step, implemented by a hardware processor, of analyzing an image of a form so as to extract one or more cells from the image of the form;
 a cell classification step of classifying each of the extracted cells, in at least one of a plurality of classes, based on a similarity calculation determined only from relations among the extracted cells from the image of the form; and
 a cell attribute definition step of defining attributes of each of the plurality of classes in which at least one of the extracted cells is classified, wherein, when an attribute of a first cell of the extracted cells classified in one of the plurality of classes is defined, other cells of the extracted cells classified in the same one of the plurality of classes automatically copy the attribute of the first cell.

2. The form template definition method according to claim 1, wherein:
 when the attribute of the first cell changes, the other cells in the same one of the plurality classes automatically change in correspondence with the changed attribute.

3. The form template definition method according to claim 1, wherein:
 the cell classification step is automatically carried out based on the similarity calculation.

4. The form template definition method according to claim 1, wherein the relations include comparisons, among the extracted cells, of heights and widths of the extracted cells.

5. The form template definition method according to claim 1, wherein the relations include comparisons, among the extracted cells, of contents of the extracted cells.

6. The form template definition method according to claim 1, wherein the relations include a horizontal adjacency of the extracted cells.

7. The form template definition method according to claim 1, wherein the relations include a vertical adjacency of the extracted cells.

8. The form template definition method according to claim 1, wherein the cell classification step excludes matching the image of the form with a stored template.

9. The form template definition method according to claim 8, wherein the similarity calculation excludes matching the extracted cells with the stored template.

* * * * *